United States Patent
Azibert et al.

(10) Patent No.: US 9,810,324 B2
(45) Date of Patent: Nov. 7, 2017

(54) METHODS AND APPARATUSES FOR PRODUCING A BRAIDED DUAL-SIDED COMPRESSION PACKING SEAL AND METHODS OF USING THE SAME

(71) Applicant: A.W. CHESTERTON COMPANY, Woburn, MA (US)

(72) Inventors: Henri V. Azibert, Windham, NH (US); Paul Vincent Starbile, Woburn, MA (US); Philip Michael Mahoney, Jr., Roslindale, MA (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 0 days.

(21) Appl. No.: 13/627,373

(22) Filed: Sep. 26, 2012

(65) Prior Publication Data

US 2013/0075978 A1 Mar. 28, 2013

Related U.S. Application Data

(60) Provisional application No. 61/539,173, filed on Sep. 26, 2011.

(51) Int. Cl.
*D04C 3/04* (2006.01)
*F16J 15/22* (2006.01)
(Continued)

(52) U.S. Cl.
CPC ............... *F16J 15/22* (2013.01); *D04C 1/12* (2013.01); *D04C 3/04* (2013.01); *D04C 3/12* (2013.01);
(Continued)

(58) Field of Classification Search
CPC ....................................... F16J 15/22
(Continued)

(56) References Cited

U.S. PATENT DOCUMENTS 1,086,240 A * 2/1914 Strong .......................... 277/529
1,171,090 A 2/1916 Cook
(Continued)

FOREIGN PATENT DOCUMENTS

DE 575156 4/1933
DE 19749248 C1 9/1999
(Continued)

OTHER PUBLICATIONS

International Search Report and Written Opinion for Application No. PCT/US2012/057262, 20 pages, dated Feb. 22, 2013.
(Continued)

*Primary Examiner* — Kristina Fulton
*Assistant Examiner* — L. Susmitha Koneru
(74) *Attorney, Agent, or Firm* — Nelson Mullins Riley & Scarborough LLP

(57) ABSTRACT

The present application pertains to a braided dual-sided compression packing seal, methods for producing and using such a seal, and apparatuses suitable for producing such a seal. The braided dual-sided compression packing seal is made up of two or more different materials that are braided together in such a way that, in cross-section, the compression packing seal has an asymmetrical configuration relative to a first axis that is substantially perpendicular to the longitudinal axis and is substantially perpendicular to a side of the compression packing seal. Accordingly, when viewed in a cross-sectional plane, the compression packing seal may expose substantially only a first material along a first side of the seal, and substantially only a second material along a second side of the seal.

31 Claims, 14 Drawing Sheets

(51) Int. Cl.
*D04C 1/12* (2006.01)
*D04C 3/12* (2006.01)

(52) U.S. Cl.
CPC ..... *D10B 2505/06* (2013.01); *Y10T 29/49826* (2015.01)

(58) Field of Classification Search
USPC .................. 277/534–539, 652, 654
See application file for complete search history.

(56) References Cited

U.S. PATENT DOCUMENTS

| | | | |
|---|---|---|---|
| 1,325,950 A | | 12/1919 | McClure |
| 1,930,766 A | * | 10/1933 | Moore .................... F16J 15/22 188/251 A |
| 2,562,262 A | | 7/1951 | De Witt, Sr. |
| 2,667,684 A | | 2/1954 | Boyer et al. |
| 2,827,319 A | | 3/1958 | Pearce |
| 3,124,032 A | | 3/1964 | Webster et al. |
| 3,196,737 A | | 7/1965 | Wilkinson |
| 3,421,406 A | * | 1/1969 | Mitchell .................. D04C 1/02 87/30 |
| 3,438,841 A | | 4/1969 | Zumeta |
| 3,646,846 A | | 3/1972 | Houghton et al. |
| 4,100,835 A | | 7/1978 | Kozlowski |
| 4,550,639 A | | 11/1985 | Champlin |
| 4,559,862 A | | 12/1985 | Case et al. |
| 4,672,879 A | | 6/1987 | Champlin |
| 4,705,722 A | | 11/1987 | Ueda et al. |
| 4,729,277 A | | 3/1988 | Champlin |
| 4,802,398 A | * | 2/1989 | Champlin et al. .................. 87/8 |
| 4,936,186 A | * | 6/1990 | Sekido et al. ...................... 87/8 |
| 4,949,620 A | * | 8/1990 | Swan et al. .......................... 87/8 |
| 5,134,030 A | | 7/1992 | Ueda et al. |
| 5,225,262 A | | 7/1993 | Leduc |
| 5,240,769 A | | 8/1993 | Ueda et al. |
| 5,339,520 A | | 8/1994 | Leduc |
| 5,357,839 A | | 10/1994 | Brookstein et al. |
| 5,370,405 A | | 12/1994 | Ueda |
| 5,370,926 A | * | 12/1994 | Hopper ......................... 442/307 |
| 5,388,498 A | | 2/1995 | Dent et al. |
| 5,419,568 A | | 5/1995 | Champlin |
| 5,522,603 A | * | 6/1996 | Naitou et al. ................. 277/539 |
| 5,549,306 A | | 8/1996 | Ueda |
| 5,605,341 A | * | 2/1997 | Ueda ............................. 277/536 |
| 5,609,708 A | * | 3/1997 | Suggs et al. .................. 156/166 |
| 5,687,974 A | * | 11/1997 | Wilkinson et al. ........... 277/537 |
| 5,794,504 A | * | 8/1998 | Starbile ............................ 87/1 |
| 5,802,828 A | * | 9/1998 | Adorno ........................... 57/232 |
| 6,270,083 B1 | | 8/2001 | Hirschvogel et al. |
| 6,385,956 B1 | | 5/2002 | Ottinger et al. |
| 6,572,117 B2 | * | 6/2003 | Fujiwara et al. ............. 277/529 |
| 7,086,650 B2 | | 8/2006 | Fujiwara et al. |
| 8,297,624 B2 | * | 10/2012 | Ueda ............................. 277/535 |
| 2004/0021274 A1 | | 2/2004 | Ueda |
| 2015/0159757 A1 | | 6/2015 | Kawasaki et al. |

FOREIGN PATENT DOCUMENTS

| | | |
|---|---|---|
| EP | 0476306 A2 | 3/1992 |
| EP | 0750141 A1 | 12/1996 |
| FR | 39305 | 7/1978 |
| FR | 2375516 A1 | 7/1978 |
| GB | 418271 A | 10/1934 |
| GB | 1475102 A | 6/1977 |
| JP | S46-30523 Y1 | 10/1971 |
| JP | 60-252872 | 12/1985 |
| JP | S60-260332 A | 12/1985 |
| JP | S64-26069 A | 1/1989 |
| JP | 03-209069 A | 9/1991 |
| JP | 06129544 A | 5/1994 |
| JP | 06129545 A | 5/1994 |
| JP | 2002-022018 A | 1/2002 |
| JP | 2007-198602 | 8/2007 |
| KR | 10-1123530 | 3/2012 |
| WO | 94/11555 A1 | 5/1994 |
| WO | 0149911 A1 | 7/2001 |

OTHER PUBLICATIONS

Supplementary Partial European Search Report, EP 12837380, dated Jun. 8, 2015, pp. 1-7.

International Search Report and Written Opinion for Application No. PCT/US2013/061989, 12 pages, dated Feb. 21, 2014.

U.S. Appl. No. 14/038,235, filed Sep. 26, 2013, Paul Vincent Starbile.

* cited by examiner

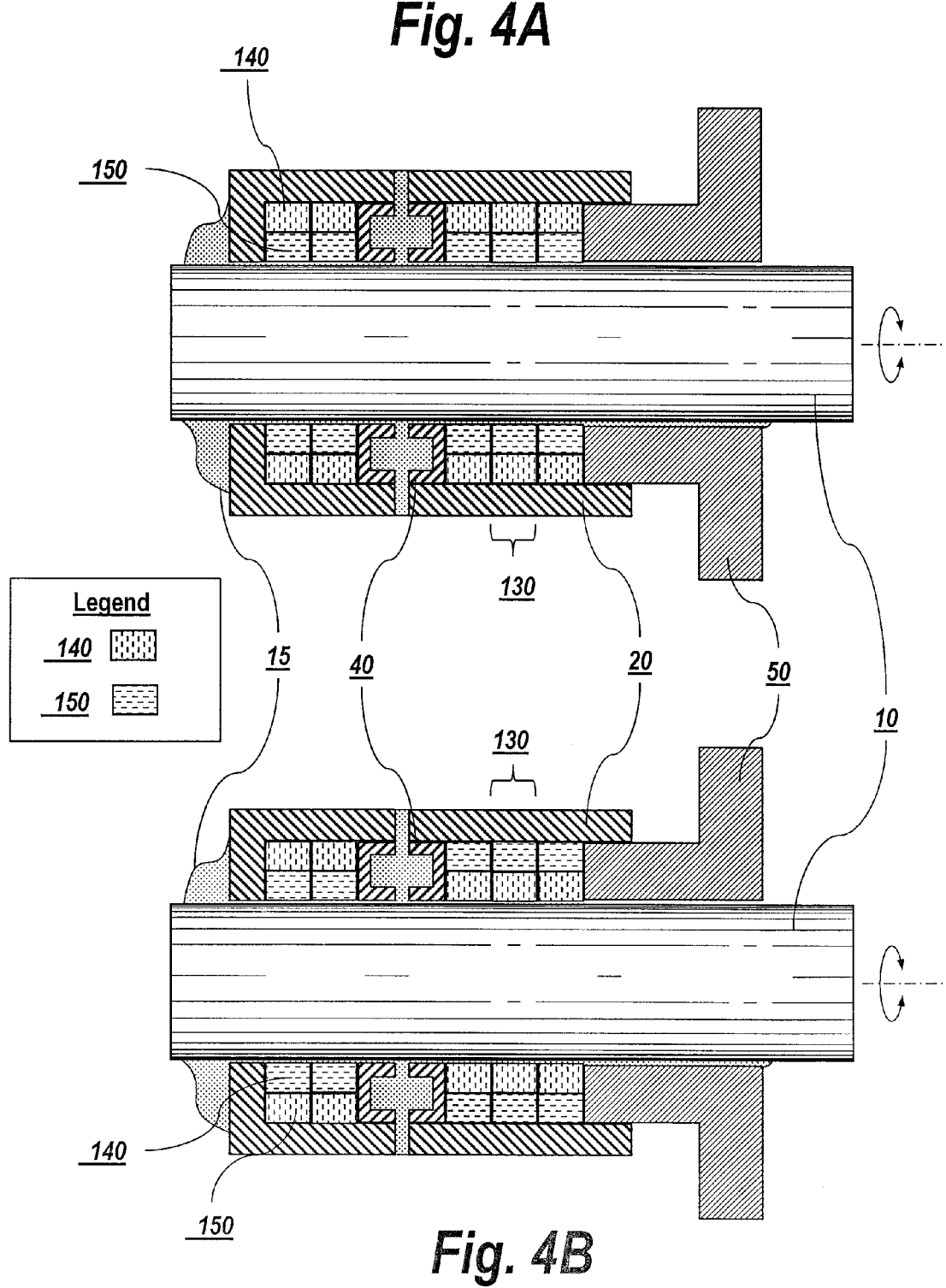

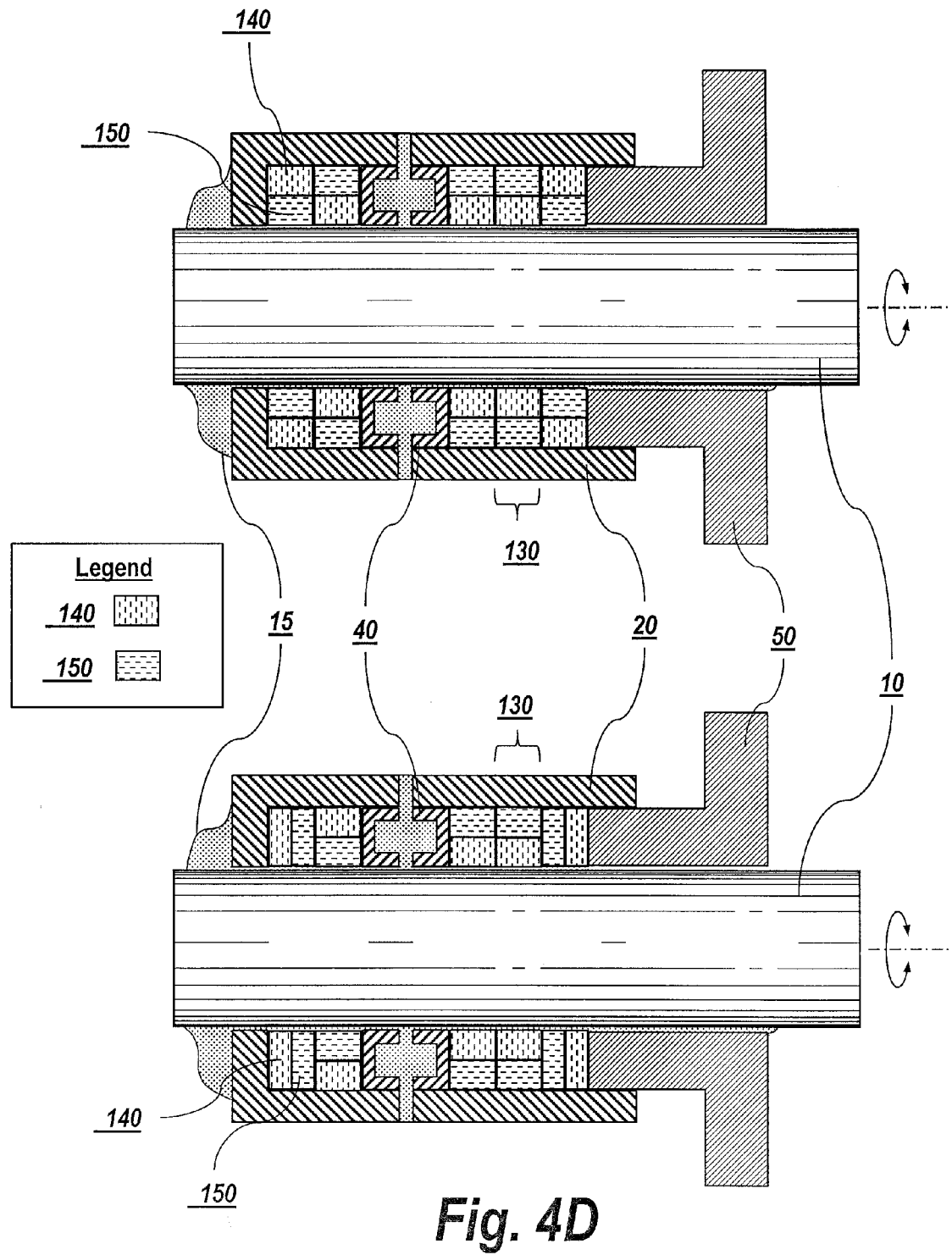

METHODS AND APPARATUSES FOR PRODUCING A BRAIDED DUAL-SIDED COMPRESSION PACKING SEAL AND METHODS OF USING THE SAME

RELATED APPLICATIONS

This application claims priority to U.S. Provisional Application No. 61/539,173, filed on Sep. 26, 2011 and entitled "Methods and Apparatuses for Producing a Braided Dual-Sided Compression Packing Seal and Methods of Using the Same." The contents of the aforementioned application are incorporated herein by reference.

BACKGROUND OF THE INVENTION

In some mechanical fields, a seal must be effected between pieces of equipment. For example, one common application of sealing technology relates to a spinning shaft having fluid 15 at one end. In such a situation, as depicted in FIGS. 1A and 1B, it may be desirable to prevent the fluid 15 from leaking around the shaft 10.

Accordingly, a stuffing box 20 may surround the shaft 10. The stuffing box 20 may include a packing material, referred to herein as a compression packing seal 30, which is wrapped around the rotating shaft and provides an interface and sealing surface between the rotating shaft 10 and the stuffing box 20. The compression packing seal 30 can be composed of a series of axially abutting packing rings. A lantern ring 40 is commonly employed and is mounted with the packing rings 30. The lantern ring 40 communicates with the shaft and with a fluid delivering channel 42 formed in the stuffing box 20. The lantern ring may include a hole for delivering a fluid, such as water or a lubricating oil, from the channel 42 to the rotating shaft 10.

The compression packing seal 30 may be in the form of a braided material that is commonly square or round when viewed in cross section, although the compression packing seal 30 may be provided in a variety of cross-sectional shapes. The compression packing seal 30 may be cut to an appropriate size and wrapped around the shaft 10 to form a ring. Multiple rings may be provided along the length of the shaft 10 in order to provide a seal around the shaft 10. A packing gland 50 is used to secure the compression packing seal(s) 30 inside the stuffing box 20.

Typically, in order to form the compression packing seal 30, one or more materials are braided together in a braid pattern, such as a square pattern or a corner-reinforced pattern. The braiding patterns are realized by moving two or more yarns along a series of material paths in an x-y plane, which builds up a braided structure that increases in size in a z-plane. FIGS. 2A-2D depict common braiding patterns used in conventional compression packing seals.

For example, FIG. 2A depicts a braid known as a square braid, formed by braiding two yarns, typically of the same type of material, along a two-tracked set of material paths 60 (depicted in the above-noted x-y plane). The result is a braided structure 70, shown in FIG. 2B, where the two yarns alternate at each corner of the square.

FIG. 2C depicts a 3-track interbraided square structure, wherein three yarns are braided along a three-tracked set of material paths 80. The result is a braided structure 90, shown in FIG. 2D, where the three yarns alternate on each side of the square. FIG. 2E depicts a three-dimensional perspective view of the braided structure 90 of FIG. 2D.

Similarly, FIG. 2F depicts a 4-track interbraided square structure, wherein four yarns are braided along a four-tracked set of material paths 100. The result is a braided structure 110, shown in FIG. 2G, where the four materials alternate on each side of the square.

FIG. 2H depicts a special case of the 4-track interbraided square structure of FIG. 2F. In FIG. 2H, a four-tracked set of material paths 120 is provided. However, two different types of materials are used for the yarns in the four-tracked material path. That is, the same material is repeated on two "internal" material paths, and a different material is repeated on the "external" material paths. Thus, the first material is present along the sides of the compression packing seal, while the second material is present in the corners of the compression packing seal, as shown in FIG. 2I. This structure may be useful, for example, if the corners of the compression packing seal are expected to receive more wear than the sides. Thus, a sturdier material may be used to reinforce the corner sections, while a less expensive material may be used to fill in the sides.

A variety of types of materials may be used to form the compression packing seal, and properties of the stuffing box/shaft/fluid system may affect the requirements of the packing seal and therefore the materials employed in the compression packing seal.

However, the properties of the stuffing box/shaft/fluid system may not be evenly distributed, qualitatively or quantitatively, throughout the system. For example, the side of the packing seal that faces the shaft may be exposed to a large amount of wear-and-tear due to the rotation of the shaft, while the opposite side (which faces the stuffing box) may be subjected to significantly reduced stress. Further, the side of the seal in the corner of the stuffing box nearest to the fluid that is sealed against may need to have a greater resistance to extrusion, because at this location the seal must effect a seal with a gap between the bottom of the stuffing box and the shaft. There is not an extrusion concern on intermediate rings of the seal because there is not a need to seal across such a gap.

The conventional braiding patterns described above each suffers from shortcomings in addressing the above-noted problem. More specifically, the different materials of the braided structures tend to be distributed evenly around the entire braided structure. For example, as shown in the four-tracked structure 100 of FIG. 2C, each side of the 4-track interbraided square structure exposes all of the materials. Thus, it is difficult to deploy the 4-track interbraided structure so that only certain materials are exposed to certain conditions. For example, it is not possible for the 4-track interbraided structure to present one material chosen for durability on the side facing the shaft 10, and another inexpensive material on the side facing the stuffing box 20. Instead, all four materials are present facing every direction.

SUMMARY OF THE INVENTION

The present application addresses shortcomings of existing compression packing seals with respect to the above-noted uneven distribution of stresses throughout the equipment/seal system.

As described in more detail below, a dual-sided compression packing seal is provided. The compression packing seal is a single braided structure having a surface area. Approximately a continuous first half of the surface area is composed of a first material, and approximately a continuous second half of the surface area is composed of a second material that is different from the first material. That is, the compression packing seal is asymmetrical and exposes a different material on either side.

Accordingly, a single compression packing seal can be employed in different situations, and can exhibit different advantages based on the makeup of the first and second materials. For example, a relatively more expensive and stronger first material may be used, while a relatively less expensive and weaker second material may also be incorporate. In use, the compression packing seal may be oriented so that the stronger first material faces a surface that will subject the compression packing seal to a high degree of wear-and-tear, such as a rotating shaft. The weaker second material may face in the opposite, which in many applications means that the second material will face a static surface on the inside of a stuffing box. Thus, the second material is not subject to as much wear-and-tear as the first material. With this configuration, the stronger first material can be leveraged to extend the life of the seal, while the presence of the weaker second material keeps the cost of producing the compression packing seal relatively low.

Advantageously, the compression packing seal can be produced by braiding the first and second materials on a single machine in a single pass. Thus, the cost of production is kept lower than, for example, a compression packing seal produced by separately manufacturing different parts of the packing on different machines and then affixing the parts together with an adhesive. Furthermore, the structure of an inter-braided compression packing material is stronger than if the materials were separately braided and affixed with an adhesive.

The compression packing seal is made up of at least a first material and a second material different than the first material. The first material is braided with the second material to form the compression packing seal. The first material and the second material are disposed relative to each other such that, in cross-section, the compression packing seal has an asymmetrical configuration relative to a first axis that is substantially perpendicular to the longitudinal axis and is substantially perpendicular to a side of the compression packing seal.

Exemplary embodiments also provide methods for producing the braided dual-sided compression packing seal. At least a first material and a second material may be provided to a plurality of carriers following at least four material paths. The material paths may include a first material path that is substantially triangular in shape, a second material path and a third material path that are substantially square in shape, and a fourth material path that is substantially triangular in shape. The first material and the second material may be interlocked along the four material paths to form the compression packing seal. The interlocking may be done in such a manner so that the first material and the second material are disposed relative to each other such that, in cross-section, the compression packing seal has an asymmetrical configuration relative to a first axis perpendicular to the longitudinal axis.

Exemplary embodiments further provide apparatuses for producing a dual-sided compression packing seal. The apparatus may include a first row of horn gears for moving the first and second materials, a second row of horn gears for moving the first and second materials, and a third row of horn gears for moving the first and second materials. One or more carriers may also be provided for transferring the first material or the second material from a first horn gear to a second horn gear in the same row, or from the first horn gear to a second horn gear in an adjacent row. The first, second, and third row of horn gears may interconnect to form at least four material paths along one or more material tracks. The material paths may include a first material path that is substantially triangular in shape, a second material path and a third material path that are substantially square in shape, and a fourth material path that is substantially triangular in shape.

In some embodiments, the braided dual-sided compression packing seal may be employed by placing the compression packing seal into a stuffing box. The seal may be provided around a shaft. Multiple types of compression packing seals may be used in conjunction with a single stuffing box, or the same type of compression packing seal may be used repeatedly, in the same or differing configurations.

DESCRIPTION OF THE FIGURES

FIG. 4A depicts a first exemplary configuration of the compression packing seal of the present invention disposed inside a stuffing box.

FIG. 4B depicts a second exemplary configuration of the compression packing seal of the present invention disposed inside a stuffing box.

FIG. 4C depicts a third exemplary configuration of the compression packing seal of the present invention disposed inside a stuffing box.

FIG. 4D depicts a fourth exemplary configuration of the compression packing seal of the present invention disposed inside a stuffing box.

DETAILED DESCRIPTION

Existing compression packing seals are ill-suited for handling the uneven distribution of stresses and other factors commonly associated with mechanical equipment. Conventional braiding techniques allow for different material types to be mixed, but typically only in symmetrical braiding patterns. Accordingly, conventional braiding techniques typically do not allow and are unsuitable for manufacturing a braided compression packing seal with a first material disposed substantially entirely on one side (e.g., substantially about a continuous 50% of the surface area of the seal) and a second material substantially entirely on a different side (e.g., substantially the continuous 50% of the surface area of the seal opposing the first side). As used herein in the current context, the term "substantially" is intended to infer that the material is disposed in a continuous manner over more than about half (50%) of the side of the braid, preferably over the vast majority of the side of the braid, and most preferably over the entire side of the braid.

One possible solution is to separately braid two different compression packing seals, and then secure the two different compression packing seals together (e.g., with an adhesive). However, such a solution is problematic for a number of reasons. For example, this solution requires that two braided structures be created. Thus, the time required to braid the materials, and the wear-and-tear on the braiding machinery, is double what it would otherwise be if the braid consisted of a single material. Furthermore, because the different packing seals are merely secured together with adhesive, the resulting packing material is not as strong as a packing in which the constituent materials are braided together.

Accordingly, it is desirable and advantageous to be able to produce a braided compression packing seal with asymmetrical properties in which the constituent materials are braided together using a single pass on a single braiding machine, without requiring the sue of an adhesive. An example of such a braided compression packing seal, produced using the techniques discussed in more detail herein, is shown in FIG. 3.

Figure 1A:
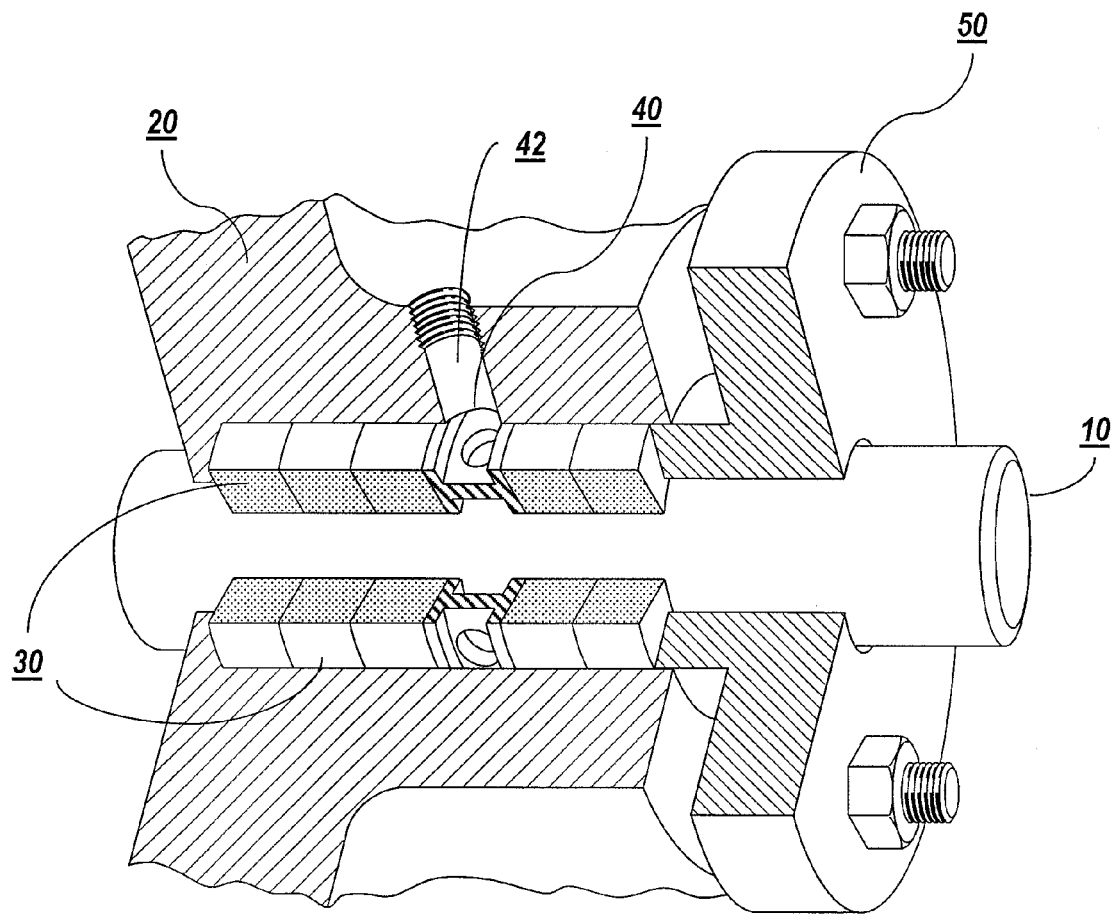
FIG. 1A depicts an exemplary conventional stuffing box and compression packing seal used to secure against a rotating shaft.
Figure 1B:
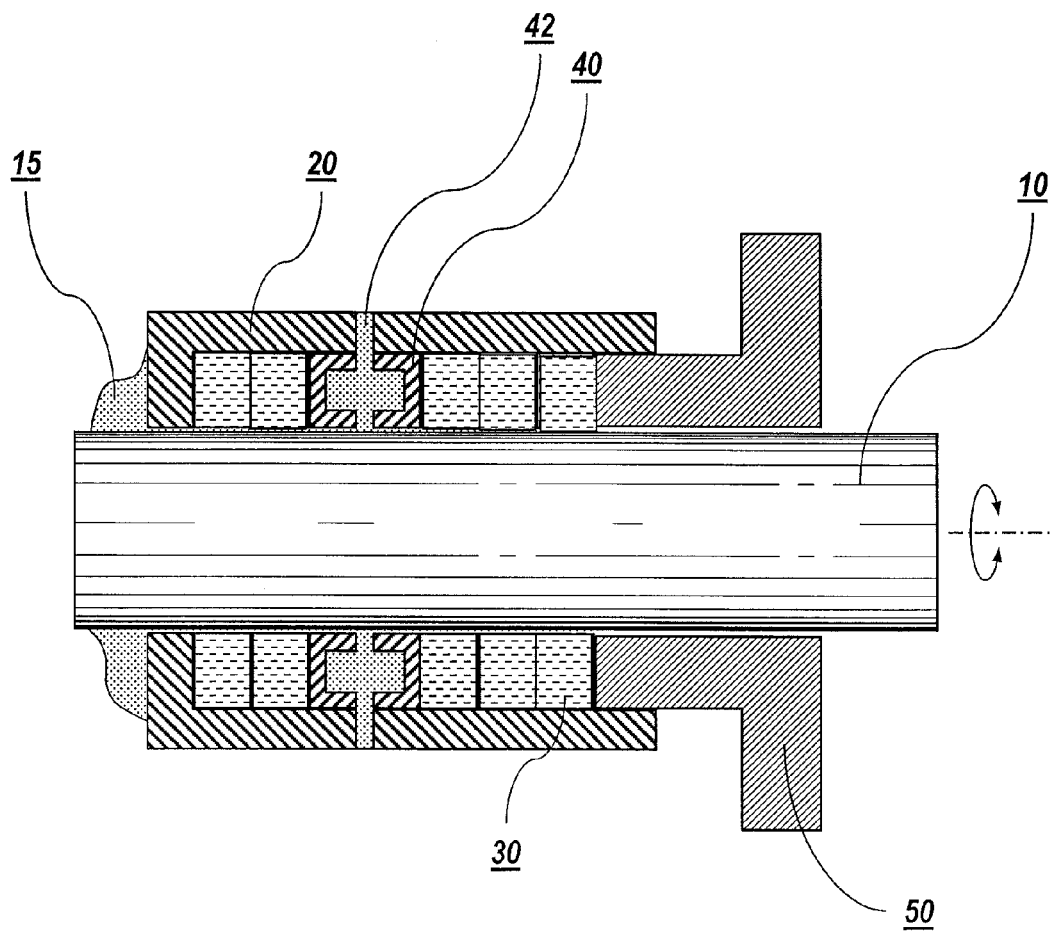
FIG. 1B is a cross-sectional view of the stuffing box and rotating shaft of FIG. 1A.
Figure 2A:
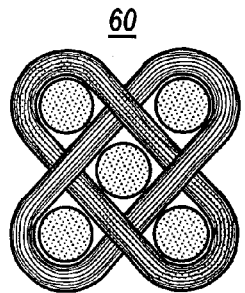
FIG. 2A depicts an example of a braiding pattern for a conventional 2-tracked square braid.
Figure 2B:
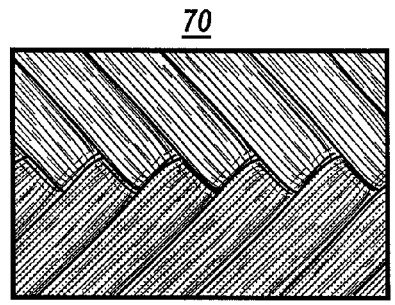
FIG. 2B depicts an example of one side of a square braid braided according to the pattern depicted in FIG. 2A.
Figure 2C:
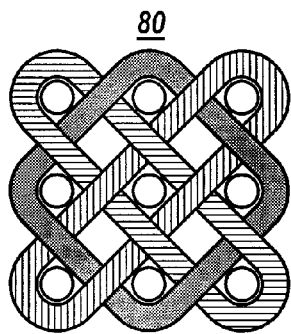
FIG. 2C depicts an example of a braiding pattern for a conventional 3-tracked square interbraid.
Figure 2D:
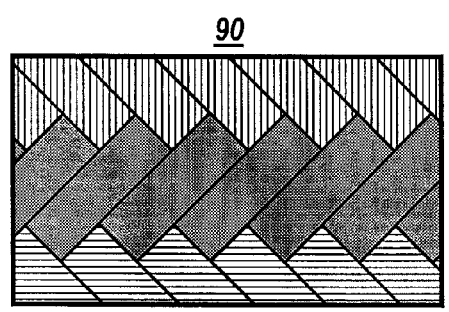
FIG. 2D depicts an example of one side of a square braid braided according to the pattern depicted in FIG. 2C, shown in a two-dimensional perspective.
Figure 2E:
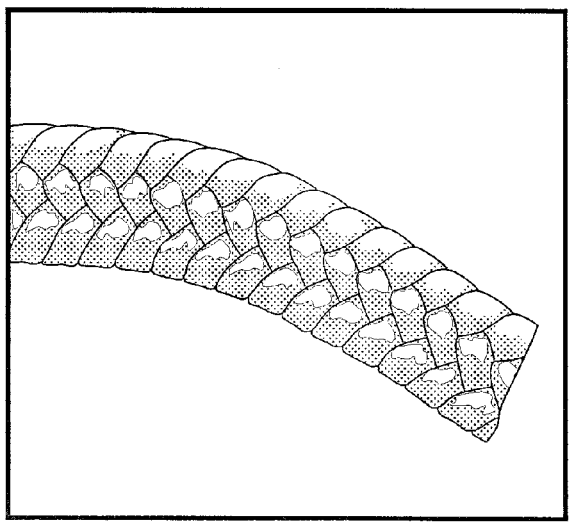
FIG. 2E depicts an example of one side of a square braid braided according to the pattern depicted in FIG. 2C, shown in a three-dimensional perspective.
Figure 2F:
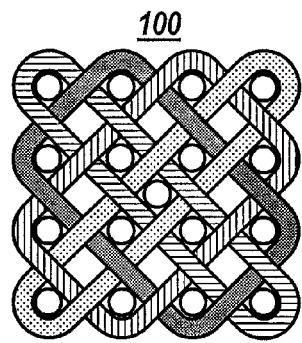
FIG. 2F depicts an example of a braiding pattern for a conventional 4-tracked square interbraid.
Figure 2G:
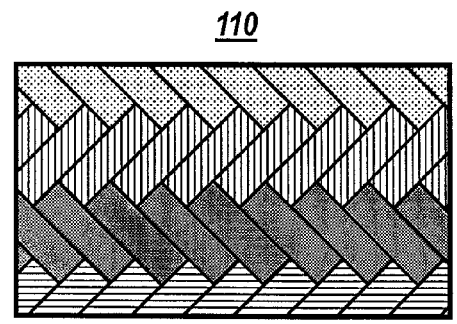
FIG. 2G depicts an example of one side of an interbraid braided according to the pattern depicted in FIG. 2F.
Figure 2H:
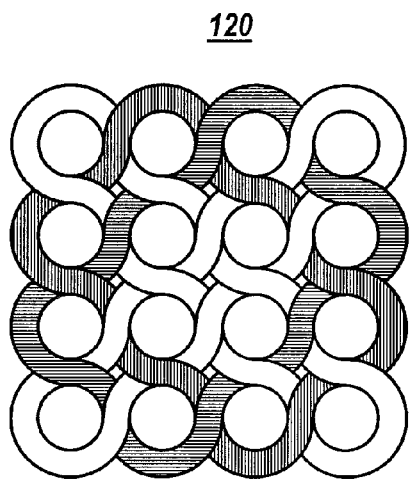
FIG. 2H depicts an example of a braiding pattern for a conventional 4-tracked square corner-reinforced interbraid.
Figure 2I:
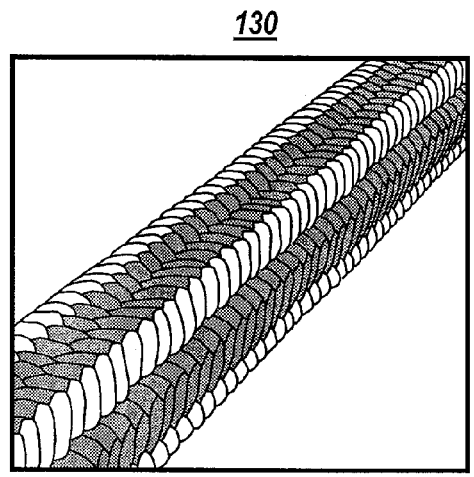
FIG. 2I depicts an example of two sides of a square corner-reinforced interbraid braided according to the pattern depicted in FIG. 2H, shown in a three-dimensional perspective.
Figure 3:
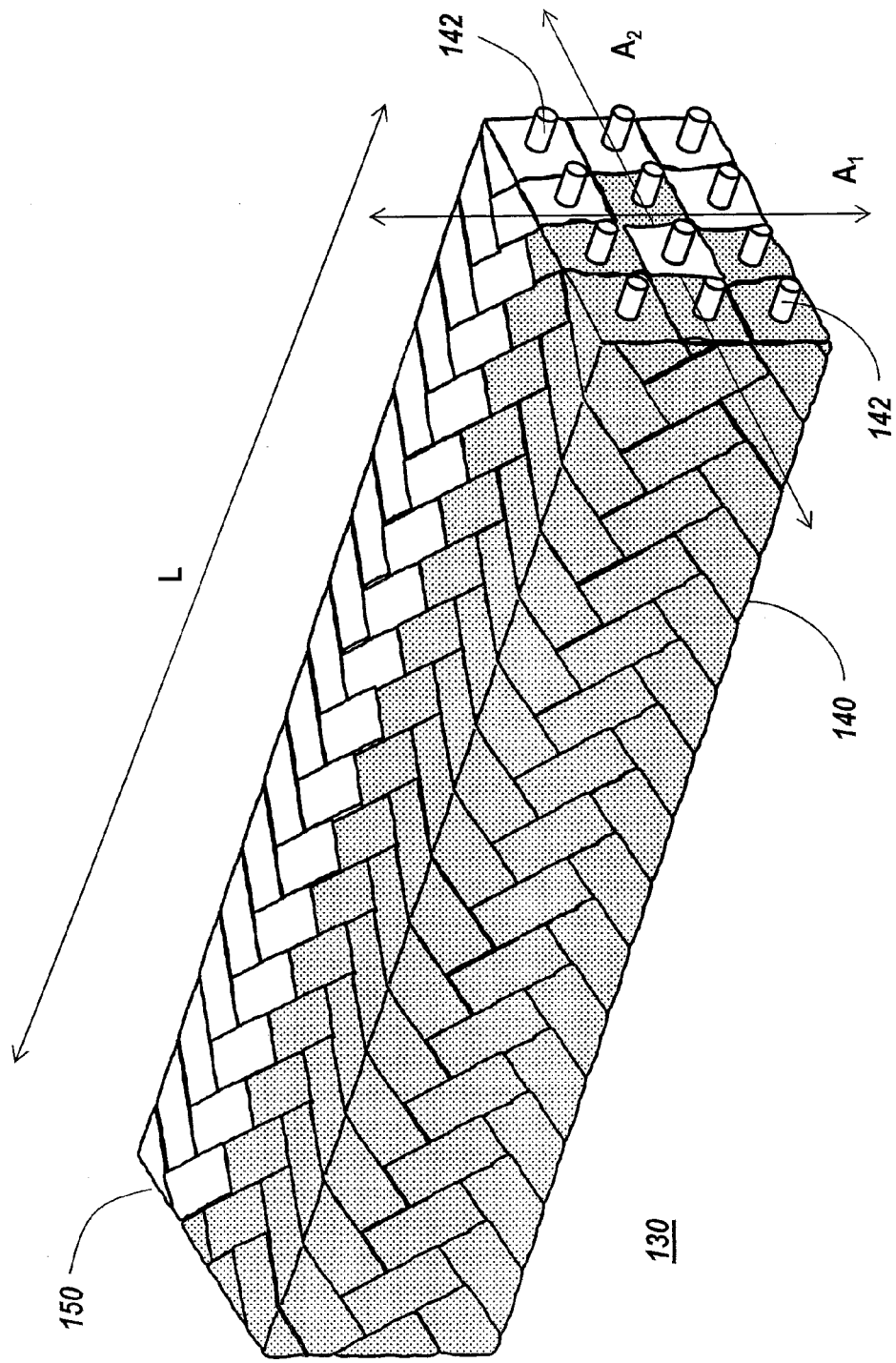
FIG. 3 depicts a side view of a braided dual sided compression packing according to an exemplary embodiment of the present invention.

As shown in FIG. 3, exemplary embodiments provide a braided dual-sided compression packing seal 130. The braid may take a number of forms—for example, the compression packing seal 130 may be braided in an interbraid pattern.

A longitudinal axis "L" extends through the center of the compression packing seal 130 along a length of the compression packing seal. A first axis "$A_1$" is substantially perpendicular to the longitudinal axis L and is substantially perpendicular to a side of the compression packing seal 130. The compression packing seal 130 of the present application may be composed of at least a first material 140 and a second material 150, which may be braided together in such a way that, when viewed in cross-section, the compression packing seal 130 has an asymmetrical configuration relative to the first axis $A_1$. That is, the first material 140 is disposed substantially completely along one exterior side of the compression packing seal 130, while the second material 150 is disposed substantially completely along an opposing exterior side of the compression packing seal 130. On the other hand, one can define a second axis $A_2$ perpendicular to the first axis such that, in cross-section, the compression packing seal 130 has a symmetrical configuration relative to the second axis $A_2$.

Stated differently, the compression packing seal 130 may have a plurality of sides, and the compression packing seal 130 presents an asymmetrical configuration when viewed in a plane that is perpendicular to the sides.

When viewed in cross section, one or more of the first and second materials 140, 150 may be formed within the compression packing seal 130 in a substantially triangular shape. Further, one or more of the first and second materials 140, 150 may be formed within the compression packing seal 130 in a substantially square shape.

FIG. 3 depicts a compression packing seal 130 that is substantially rectangular in cross section, with a ratio of the length of the sides of the compression packing seal 130 being substantially 4:3. A rectangular cross section on the compression packing seal 130 may be advantageous, especially in small cross section packing, where a rectangular compression packing seal 130 may be less likely to twist during installation, or where fewer rings made up of the compression packing seal 130 would be needed to fill one stuffing box 20 (thus speeding up installation).

However, one of ordinary skill in the art will understand that different shapes for the compression packing seal 130 may be realized by varying the materials, material thickness or density, and/or braiding pattern used.

It should be noted that FIG. 3 displays the seal only along a single point in cross-section. However, those of ordinary skill will readily recognize that the two materials alternate at different internal locations as one moves through the material along the longitudinal axis L. Such an alternating configuration is best seen in connection with FIG. 4A.

The first material 140 and the second material 150 can be readily and easily selected depending upon the desired properties of the braid and the environment in which the braid is exposed to. For example, one of ordinary skill in the art would readily select the first and second materials based upon any number of different desired properties. Some exemplary considerations for the first material 140 include, but are not limited to: the first material 140 may be selected to have a higher lubricity than the second material 140; the first material 140 may be selected to have a higher sealability than the second material 150; the first material 140 may be selected to have a different construction than the second material 150 (such as a continuous fiber construction versus a staple fiber construction); the first material 140 may be selected to have a higher extrusion resistance than the second material 150; and the first material 140 may be selected to have a higher thermal conductivity than the second material 150. The first material 140 may be composed of, for example, carbon, PTFE, a para-aramid synthetic fiber, polybenzimidazole fiber (PBI), or 95%+ carbon assay, or any other material suitable for its intended purpose.

Similarly, the second material 150 may be selected to have a lower cost than the first material 140, a higher malleability than the first material 140, a higher modulus than the first material 140, or to comprise a lesser amount of PTFE than the first material 140. The second material 150 may be composed of, for example, acrylic, rayon, carbon, graphite, or fiberglass.

As illustrated in FIG. 3, one or more warps 142 may extend through the compression packing seal 100 in the longitudinal direction for reinforcing the compression packing seal 100. The warps may be composed of, for example, high grade carbon, metal wire, or para-aramid synthetic fiber, and/or the same materials as used to form the braided portion of the compression packing seal 100. Other materials may also be used that can be readily determined by one of ordinary skill in light of the teachings herein.

The first and second materials 140, 150 may be selected and deployed based on different applications of the compression packing seal 130. Advantageously, the properties of both the first and second materials 140, 150 may be leveraged in a single unitary compression packing seal 130 which can be braided in a single process on a single machine.

In one example, the first material 140 may be placed against an interior wall of a stuffing box 20. The second material 150 may be placed against the rotating shaft 10. Thus, it may be desirable to select, for the second material 150, a strong material that is more expensive than the first material 140. Because the first material 140 may experience less wear-and-tear than the second material 150 in this configuration, it may be desirable to utilize a less expensive material for the first material 140 in order to decrease the overall cost of the compression packing seal 130.

For instance, such a combination of materials may be used in a configuration similar to the one depicted in FIG. 4A. As shown in FIG. 4A, the first material 140 may be selected to have a lower cost than the second material 150. The first material 140 may, in addition or alternatively, be more malleable than the second material 150, in order to provide a better static seal against the non-rotating or stationary stuffing box 20. The first material 140 may also be selected to have a relatively high modulus for compression control, or may be selected to have a minimal polytetrafluoroethylene (PTFE) content to thereby reduce the PTFE content in the overall construction of the compression packing seal 130.

The second material 150 of the compression packing seal 130 may be provided on a side of the compression packing seal 130 that faces the shaft 10. The second material 150 in this case may be selected to have a higher lubricity and/or higher thermal conductivity than the first material 140.

In another example depicted in FIG. 4B, different materials may be selected, and the compression packing seals may be deployed in different configurations, based on the side of the lantern ring 40 on which the compression packing seal is used. The compression packing seal 130 may include a first material 140 selected for example to have a higher lubricity, higher thermal conductivity, or higher sealability than the second material 150. The second material 150, in turn, may be selected to have a higher strength or greater abrasion resistance than the first material 140. On the side of the lantern ring 40 closest to the fluid 15, the first material 140 may face the shaft 10 in order to better seal against the fluid 15. On the side of the lantern ring 40 closest to the packing gland 50, the second material 150 may face the shaft in order to reduce the overall wear-and-tear on the material. In another example using the configuration depicted in FIG. 4B in which the compression packing seal 130 seals against a slurry, the first material 140 may be a relatively strong material to resist abrasion, while the second material 150 exhibits relatively high sealability, relatively high lubricity, and relatively high thermal tolerance to reduce leakage.

Further examples are shown in FIGS. 4C and 4D. In FIG. 4C, the first material 140 faces the shaft at the ends of the stuffing box 20, providing a higher strength material in the corner gaps to prevent extrusion. The second material 150 may be selected to have improved sealing properties, thus providing a strong sealing surface in each location where extrusion is not a significant factor. FIG. 4D depicts a similar anti-extrusion configuration in which the compression packing seals 130 on either end of the rotating shaft are rotated 90 degrees from the other compression packing seals 130. In this way, the anti-extrusion properties of the first material 140 can be leveraged precisely where these properties are most helpful, while still using some of the sealing properties of the second material 150 of these particular compression packing seals 130.

One of ordinary skill in the art will recognize that the above properties, materials, and configurations are exemplary only, and that other types of materials, properties, and configurations may be selected based on the specific application.

As will be shown in more detail below with respect to FIGS. 5A-5E, the braiding pattern that is used to braid the compression packing seal 130 is not limited to two materials. Indeed, the compression packing seal 130 may further be made up of third and fourth materials, and they may be different than the first and second materials and different than each other. Alternatively, one, two, or three different materials may be used.

Figure 5A:
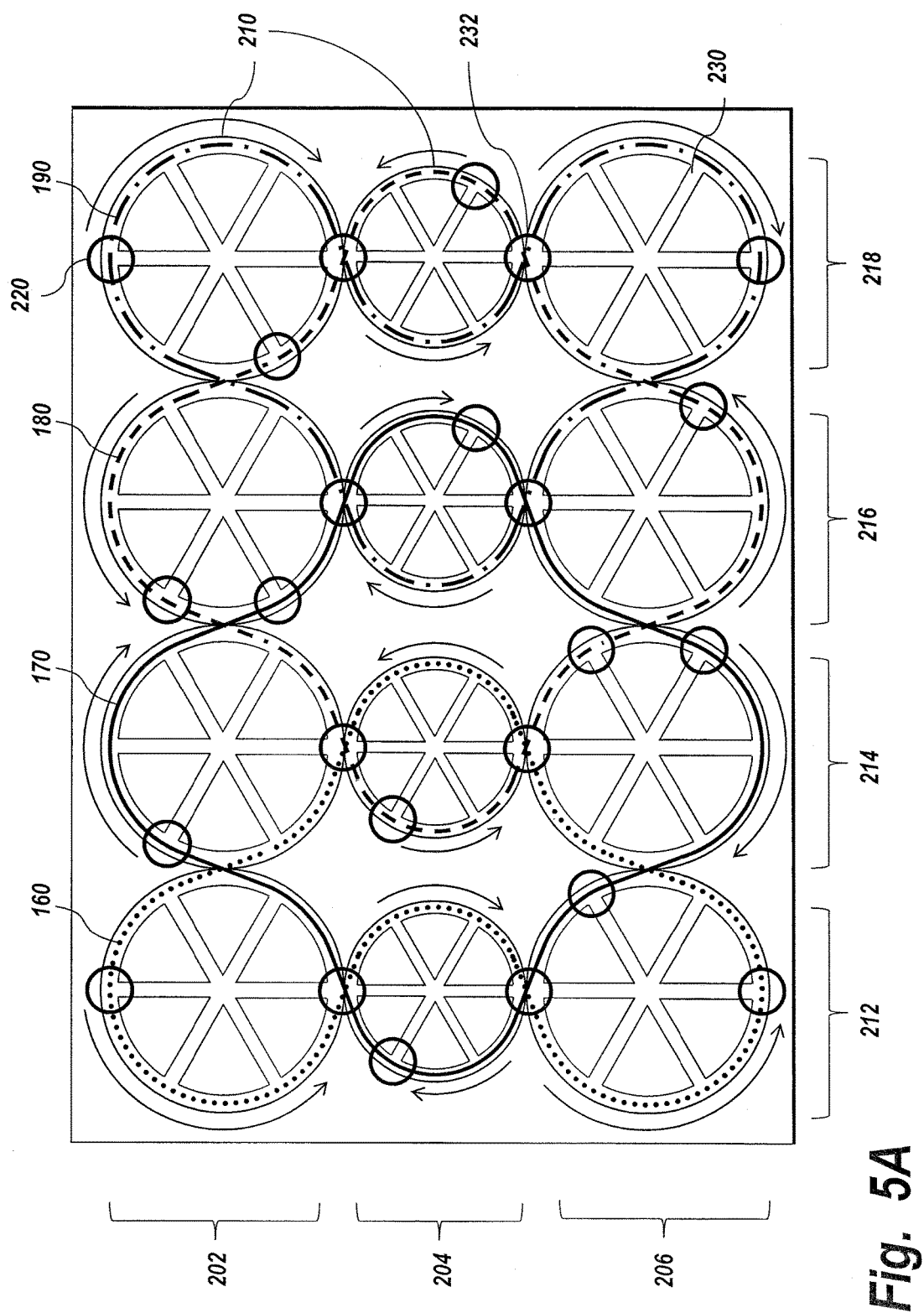
FIG. 5A depicts an exemplary braiding path layout suitable for use with exemplary embodiments of the present invention to produce a braided dual-sided compression packing according to the teachings of the present invention.
Figure 5B:
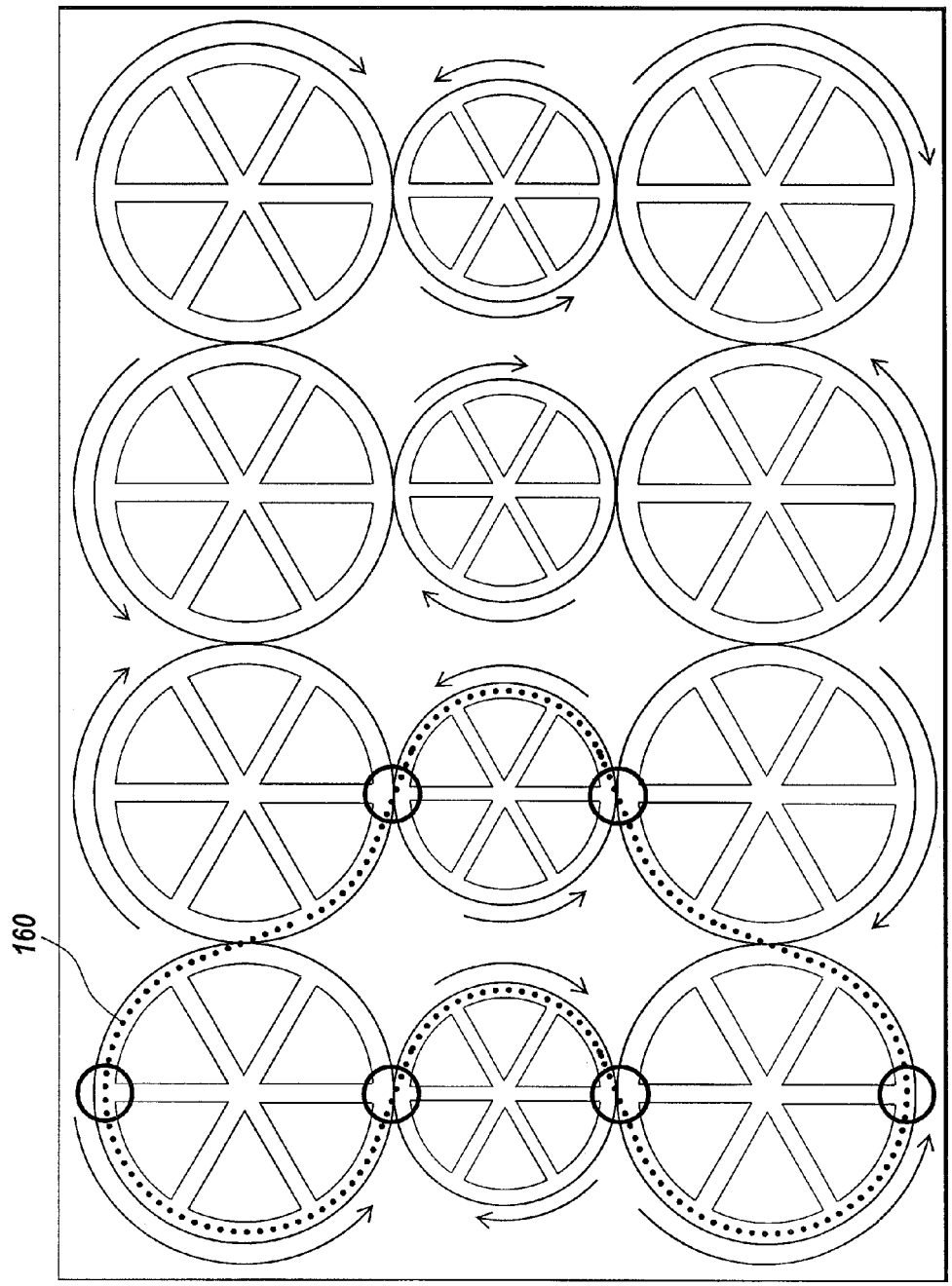
FIG. 5B depicts an exemplary first material path from the braiding path layout of FIG. 5A.
Figure 5C:
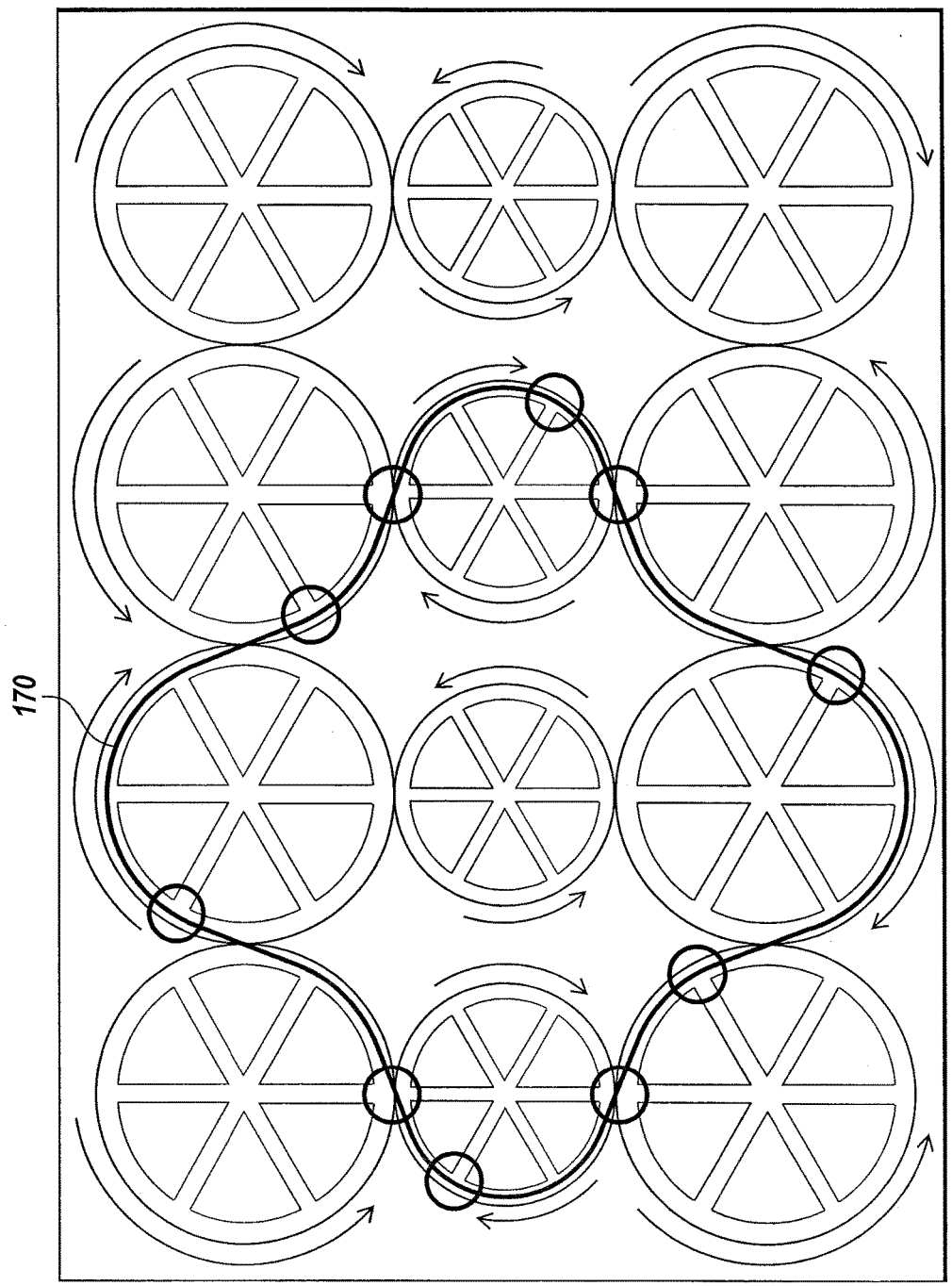
FIG. 5C depicts an exemplary second material path from the braiding path layout of FIG. 5A.
Figure 5D:
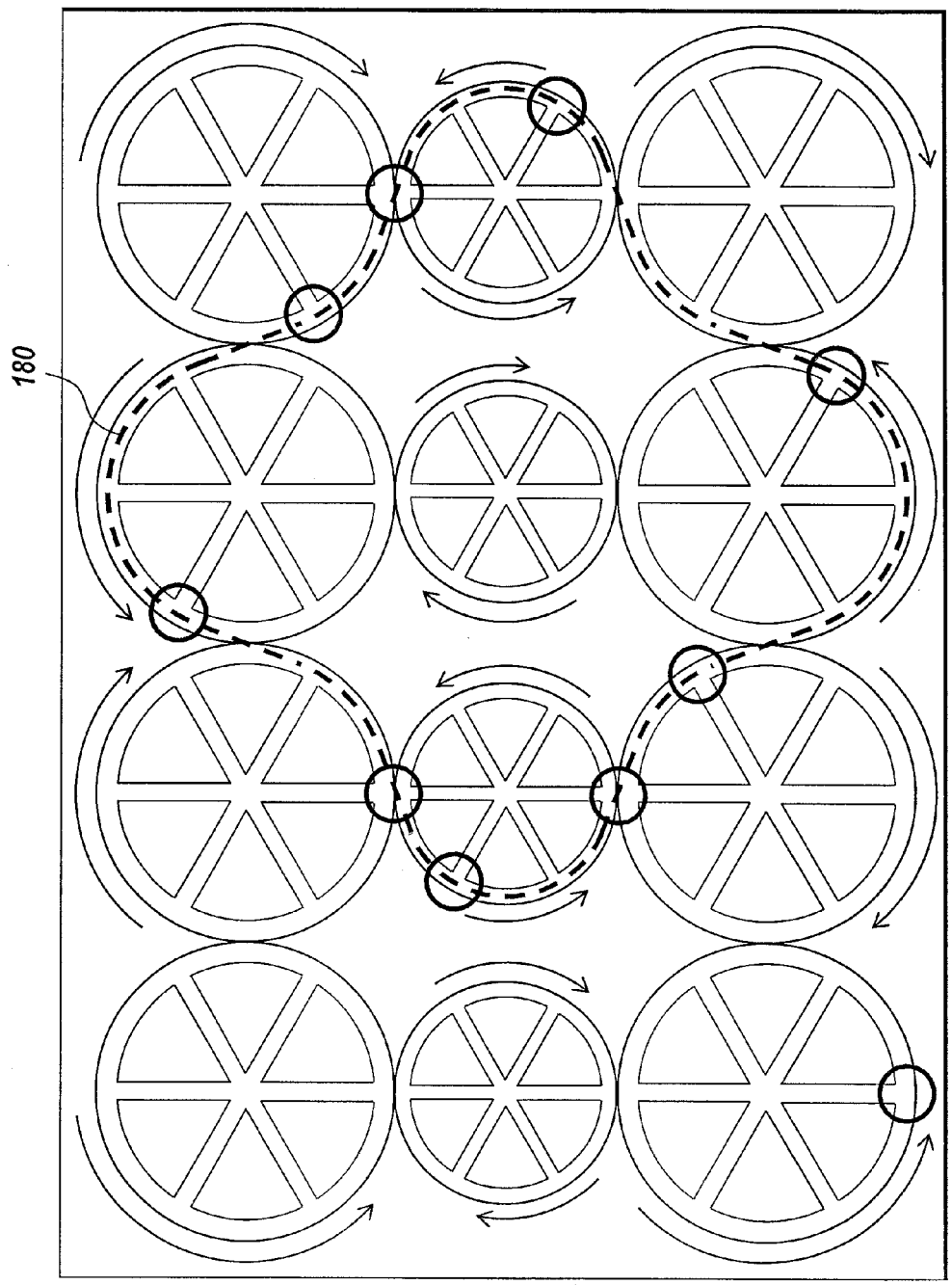
FIG. 5D depicts an exemplary third material path from the braiding path layout of FIG. 5A.
Figure 5E:
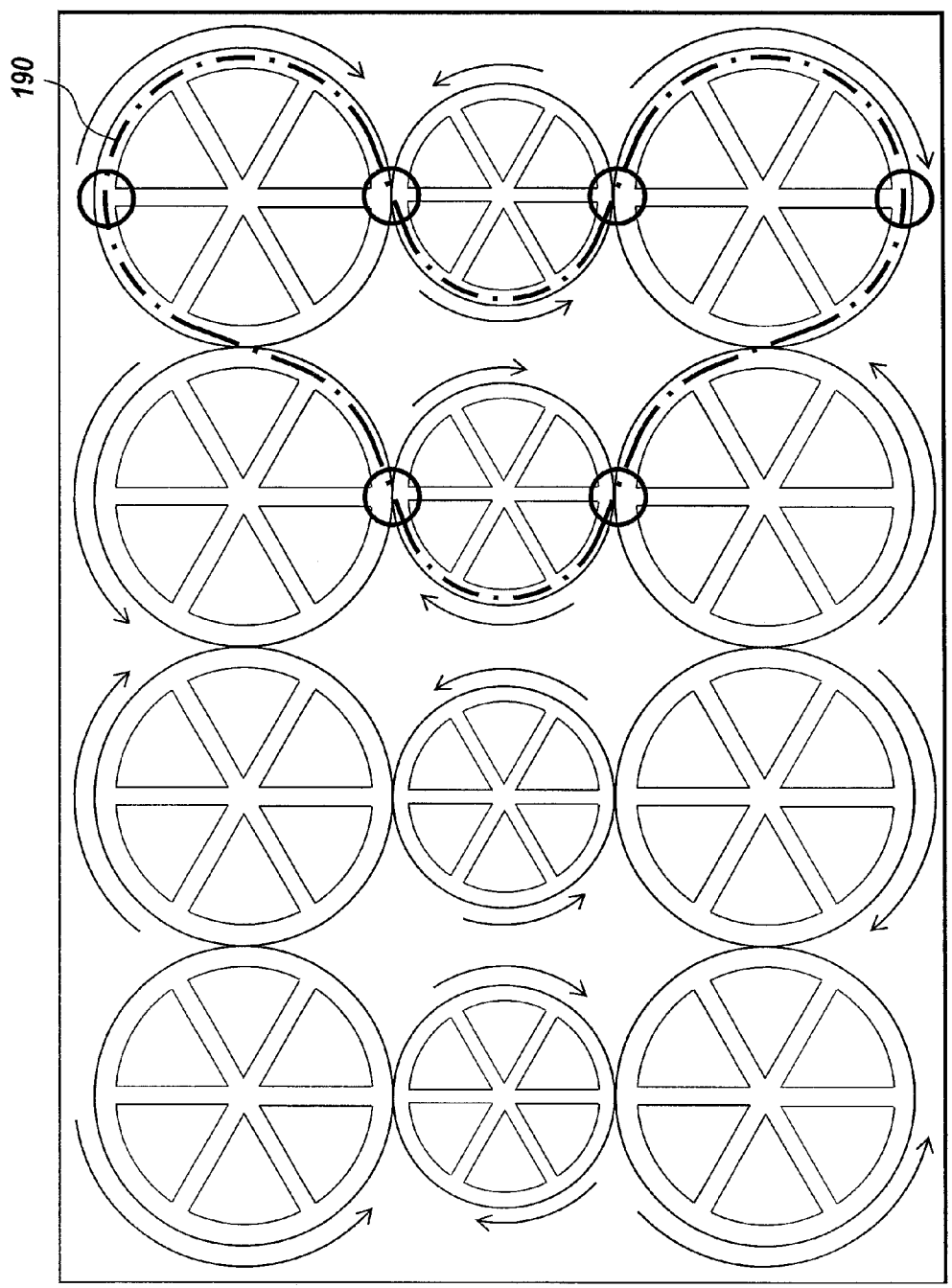
FIG. 5E depicts an exemplary fourth material path from the braiding path layout of FIG. 5A.

FIG. 5A depicts an overall braiding path layout and the material paths formed therein that may be used to braid the first and second materials 140, 150 of the compression packing seal 130. One of ordinary skill in the art will readily recognize that the material paths depicted in FIG. 5A may be defined by material tracks for use with a braiding apparatus, such as the apparatus shown in FIG. 6. As described in more detail below, one or more carriers may carry the first and second materials 140, 150 along the material paths using the tracks in order to braid the first and second materials 140, 150 together.

When braided using the material paths of FIG. 5A, the compression packing seal may include the first material 140 and the second material 150 disposed relative to each other such that, in cross-section, the compression packing seal 130 has an asymmetrical configuration relative to a first axis $A_1$ that is substantially perpendicular to the longitudinal axis L and is substantially perpendicular to a side of the compression packing seal.

The material paths may include a first material path 160 that is substantially triangular in shape, a second material path 170 and a third material path 180 that are substantially square in shape, and a fourth material path 190 that is substantially triangular in shape. The first material 140 and the second material 150 may be braided or interlocked along the material paths to form the compression packing seal 130.

FIG. 5A depicts all four material paths as they would appear on a braiding apparatus. FIGS. 5B-5E isolate the first, second, third, and fourth material paths, respectively, to further aid in clarity and understanding.

The material paths 160, 170, 180, 190 may be realized or embodied in a braiding apparatus 200 which braids the first material 140 and the second material 150 together. The braiding apparatus may move the first material 140 and the second material 150 with the assistance of a number of horn gears 210 that move carriers 220 around the material paths.

Each of the horn gears 210 may include one or more slots 230 for receiving the carriers 220. The slots 230 may be sized and configured to receive corresponding mating portions of the carriers 220 such that the carriers 220 may be secured in the slots. The slots 230 are also sized and positioned so that, if a carrier is present in a first slot at the same time that a second slot is adjacent to the first slot (e.g., as in the example at the point 232 indicated in FIG. 5A), then the carrier may be forced to move from the first slot to the second slot. That is, the carrier 220 may be transferred between adjacent horn gears 210 if the slots 230 of the horn gears 210 align at an appropriate time.

The horn gears 220 may be a series of gears of one or more sizes which are sized and configured to move the carriers 220 along the material paths without causing collisions between the carriers. More specifically, as the horn gears 210 rotate, the carriers 220 move to new positions along the material path. The carriers 220 move from one horn gear 210 to an adjacent horn gear 210 if the slots 230 of adjacent horn gears align at the appropriate time. That is, horn gears 210 and slots 230 are configured so that the carriers 220 are passed from one gear to another only at particular points, which forces a particular carrier 220 to follow only a specified path corresponding to the material path designated for the material carried by the carrier 220. Thus, a carrier 220 may be made to move along a path specific to the material carried by the particular carrier 220 in question.

By selecting horn gears 210 of appropriate sizes, the material paths 160, 170, 180, 190 can be realized while avoiding collisions between carriers 220. For example, the horn gears 210 may be arranged into three rows 202, 204, 206. The horn gears 210 of the first row 202 may have a size, which is the same as the size of the horn gears 210 of the third row 206. Horn gears of the second row 204 may be of a different size than the horn gears of the first row 202 and the third row 206.

For example, the horn gears 210 of the first row 202 of horn gears and the horn gears 210 of the third row 206 of horn gears may be substantially the same size and may further be larger than the horn gears 210 of the second row 204 of horn gears, as shown in FIG. 5A. The size may be defined, for example, by the diameter or the circumference of the horn gears 210. More specifically, a ratio of a size of the horn gears 210 of the first and third rows 202, 206 of horn gears 210 to a size of the horn gears 210 in the second row 204 of horn gears 210 may be 6:4, 6:5, or 4:3.

Instead of defining the size of the horn gears 210 by the diameter or circumference of the horn gears 210, the size may also be defined by the number of slots 230 present in the horn gear. For example, if a first horn gear 210 has a size of "6" while a second horn gear 210 has a size of "4," this may indicate that the first horn gear 210 has six slots for receiving the carriers 220 while the second horn gear 210 has four slots for receiving the carriers 220. Again, the ratio of the sizes of the horn gears 210 in this situation may be 6:4, 6:5, or 4:3.

The slots 230 may be evenly dispersed around the perimeter of the horn gear 210. For example, if a horn gear 210 has six slots 230, the slots 230 may be separated from each other in 60 degree increments along the circumference of the horn gear 210.

Preferably, the horn gears 210 of the first and third rows 202, 206 of horn gears 210 each have 6 slots 230 for receiving the carriers 220, while the horn gears 210 of the second row 204 each have either 4 or 5 active slots that receive the carriers 220. In some embodiments, each horn gear 210 of the apparatus 200 has the same number of slots 230. For example, every gear 210 may be provided with six slots 230. However, although each gear is provided with six slots 230, the gears 210 of the second row 204 may only make use of four or five slots 230 during the braiding process. That is, the gears 210 may be sized and configured so that the carriers 220 are only carried by four or five of the six slots on the gears 210 of the second row 204. One or two of the slots 230 of the horn gears 210 of the second row 204 may not receive carriers during the braiding process. Thus, only four or five of the slots 230 on the gears 210 of the second row 204 may be "active" in that they receive carriers 220 during the braiding process. The relative sizes of the horn gears 210, as well as the speed of rotation of the horn gears 210, ensure that the one or two "passive" slots never align appropriately with adjacent horn gears during the braiding process so that a carrier 220 could be transferred into the passive slots.

In addition to dividing the horn gears 210 into rows 202, 204, 206, the horn gears 210 may also be divided into columns. For example, the first, second, and third rows of horn gears may each comprise a first horn gear, a second horn gear, a third horn gear, and a fourth horn gear, respectively. Accordingly, the apparatus may have a first column 212 of horn gears 210, a second column 214, a third column 216, and a fourth column 218. Each column may include a first relatively large horn gear, and second relatively small horn gear, and a third horn gear of the same size as the first relatively large horn gear. The second horn gear of the column may be disposed between the first and third horn gears of the column.

An exemplary direction of rotation is provided for each of the horn gears 210 in FIG. 5A. In the example cited in FIG. 5A, each of horn gears 210 rotates in an opposite direction as the horn gears 210 adjacent to it. Put another way, the first horn gear and the third horn gear of each row 202, 204, 206 may rotate in the same direction, and the second horn gear and the fourth horn gear of each row 202, 204, 206 may rotate in the opposite direction of the first horn gear and the third horn gear. Those of ordinary skill will readily recognize that other rotation arrangements can also be employed.

Figure 5F:
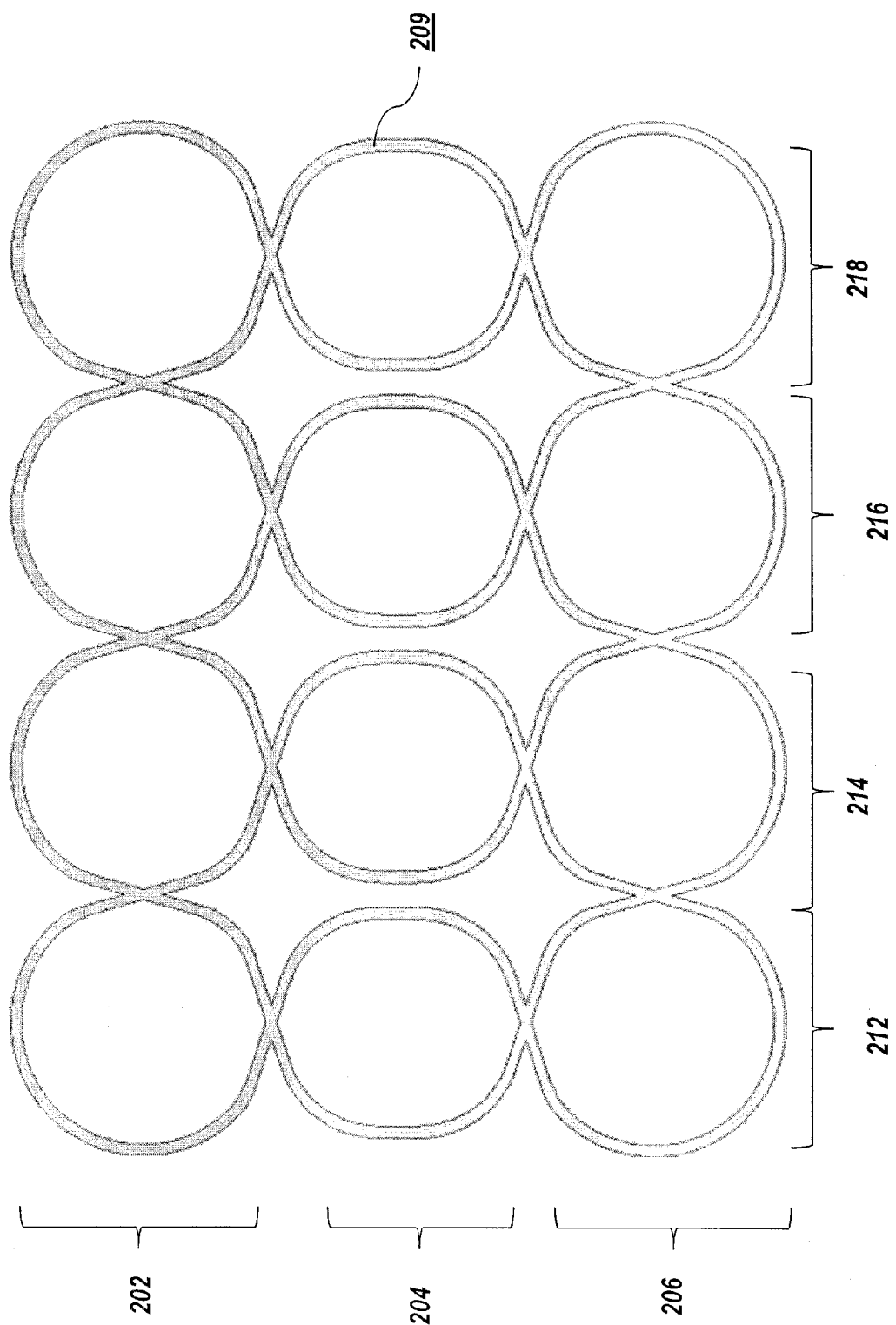
FIG. 5F depicts an alternative embodiment of the braiding path layout of FIG. 5A.
Figure 6:
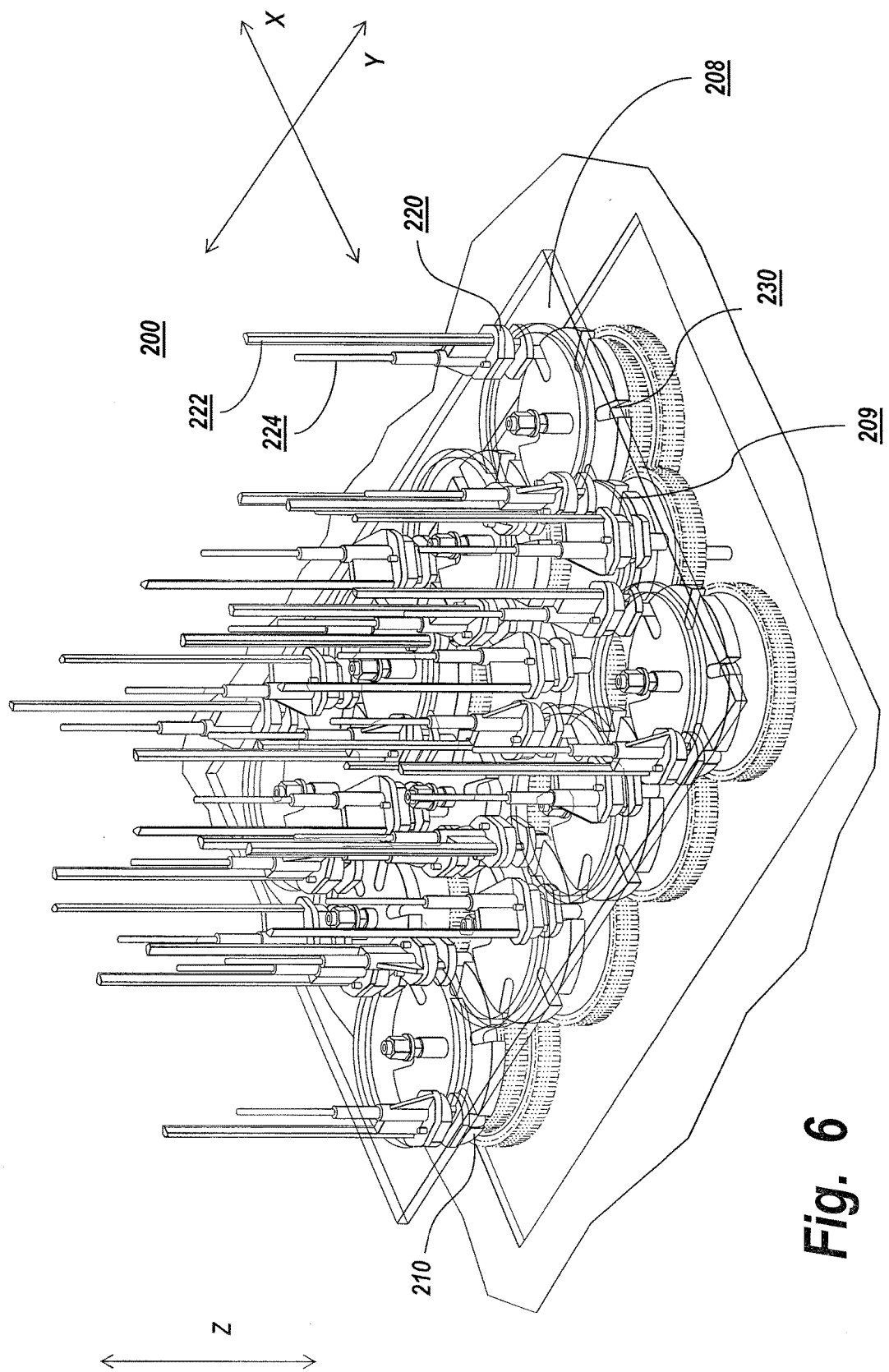
FIG. 6 depicts an exemplary apparatus employing the braiding layout of FIGS. 5A-5E and for generating the dual sided compression packing of the present invention.

It should be noted that FIGS. 5A-6 depict the horn gears 210 and carriers 220 in a particular configuration. This configuration is a representation of where the horn gears 210 and carriers 220 are positioned at a specific point in the braiding cycle. Thus, at different points in the braiding cycle, the horn gears 210 and carriers 230 may be in a different configuration than the configuration depicted in FIGS. 5A-6.

In the braiding process, the first material path 160 (see FIG. 5B) and the second material path 170 (see FIG. 5C) may carry the first material 140, and the third material path 180 (see FIG. 5D) and the fourth material path 190 (see FIG. 5E) may carry the second material 150. In this manner, the completed compression packing seal 100 will expose a first exterior side of the first material 140 and a second exterior side of the second material 150.

In other words (with reference to FIG. 5A), when the apparatus 200 is divided into four columns 212, 214, 216, 218 of horn gears, the first column 212 of horn gears 210 may move solely the first material 140, which may be carried on the first material path 160 and the second material path 170. The second column 214 of horn gears 210 may move both the first material 140 and the second material 150: the first material 140 on the first and second material paths 160, 170, and the second material 150 on the third material path 180. The third column 216 of horn gears 210 may move both the first material 140 and the second material 150: the first material 140 on the second material path 170, and the second material 150 on the third material path 180 and the fourth material path 190. The fourth column 218 of horn gears 210 may move solely the second material 150, which may be carried on the third material path 180 and the fourth material path 190.

By placing materials in a different configuration, other structures for the compression packing seal 130 may be achieved. For example, by utilizing a first material 140 in the first and fourth material paths 160, 190 and a second material 150 in the second and third material paths 170, 180, it can be seen that a compression packing seal 100 may be produced having the first material 140 in the corners and the second material 150 in internal positions. This may be useful for providing, for example, a corner-reinforced compression packing seal 100 using a high-strength first material 140 and an inexpensive second material 150.

An alternative braiding path layout is shown in FIG. 5F. The layout of the braiding paths of FIG. 5F is similar to the layout depicted in FIG. 5A, with the exception that the track of the middle row 204 creates an elliptical or oval path, instead of the circular path of FIG. 5A. This may be accomplished, for example, by an elliptical groove 209 (see FIG. 6) for defining the material paths in the middle row 204.

The apparatus 200 is shown in more detail in FIG. 6. As shown in FIG. 6, the horn gears 210 may be mounted on a plate 208. The plate 208 is provided with a number of material tracks or grooves 209 which allow the carriers 220 to move from one horn gear 210 to an adjacent horn gear 210 along a predefined material path.

As shown in FIG. 6, the horn gears 210 and grooves 209 may be circular. In other embodiments, the grooves 209 may have different shapes. For example, the grooves 209 of the first and third rows 202, 206 may be circular, while the grooves 209 of the second row 204 may be oval or elliptical. The slots 230 on the horn gears 210 in the middle row 204 may be deeper than slots 230 of the horn gears 210 in the top row 202 and the bottom row 206 in order to accommodate the inward path of the carriers 210 on the oval portion of the groove 209. The horn gears 210 of each row 202, 204, 206 may be of the same size, or may be of different sizes.

The first, second, and third row of horn gears 210 may interconnect to form at least four material paths along one or more material tracks. The material paths may include a first material path that is substantially triangular in shape, a second material path and a third material path that are substantially square in shape, and a fourth material path that is substantially triangular in shape, as described above with reference to FIG. 4A. In order to form the material tracks for the material paths, the apparatus 200 may include a plate for holding the horn gears, and the material tracks may be formed in the plate, for example by cutting grooves or through-holes into the plate.

In some embodiments, instead of three rows the apparatus 200 may be considered to have four columns of horn gears. A first column of horn gears may move solely the first material, a second column and a third column may move the first and second materials, and a fourth column may move solely the second material.

During operation, a spool containing the first material 140 or the second material 150 may be mounted to a receiving element 222 on the carriers 220. The first material 140 or the second material 150 may be fed from the spool into an appropriate receiving portion of the carrier 220. Thus, the carrier 220 may carry the spool of the material mounted on the receiving element 222 as the carrier moves around one of the material paths 160, 170, 180, 190. In this way, the materials may be braided along the x-y plane together as the carriers 220 pass by each other along the material paths. Furthermore, a passage 224 may be provided passing through the plate 208. The passage 224 may allow a warp 142 to be passed through the plate 208 in a direction perpendicular to the braiding direction (i.e., in the z-plane of FIG. 6). During the braiding process, the warps 142 may remain stationary as the carriers 220 move around the warps 142.

Using the apparatus 200 and the material paths 160, 170, 180, 190 depicted in FIGS. 5A and 6, a braided dual-sided compression packing 130 may be realized.

In view of the above, it will be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

Unless otherwise noted, terms used in the singular are understood to include the plural, and vice versa. The term "or" is understood to be inclusive and not exclusive unless otherwise noted.

It is also to be understood that the following claims are to cover all generic and specific features of the invention described herein, and all statements of the scope of the invention which, as a matter of language, might be said to fall therebetween.

The invention claimed is:

1. A braided dual-sided compression packing seal, wherein a longitudinal axis extends through the center of the compression packing seal along a length of the compression packing seal, the compression packing seal comprising at least a first material of a first material type and a second material of a second material type different than the first material type,
    wherein the first material is braided with the second material to form the compression packing seal,
    wherein the first material and the second material are disposed relative to each other such that, in cross-section, the compression packing seal has an asymmetrical configuration relative to a first axis that is substantially perpendicular to the longitudinal axis and is substantially perpendicular to a side of the compression packing seal, and
    wherein, as a result of the braiding, the first material is disposed substantially completely along one side of the compression packing seal and the second material is disposed substantially completely along the other side of the compression packing seal,
    wherein the first material is braided with the second material using an interbraid pattern.

2. The compression packing seal of claim 1, wherein the compression packing seal has a plurality of sides, and the compression packing seal presents an asymmetrical configuration when viewed in a plane that is perpendicular to the sides.

3. The compression packing seal of claim 1, wherein the first material and the second material are further disposed relative to each other such that, in cross-section, the compression packing seal has a symmetrical configuration relative to a second axis perpendicular to the first axis.

4. The compression packing seal of claim 1, further comprising first and second exterior sides opposed to each other, wherein the first exterior side is substantially composed of the first type of material and the second exterior side is substantially composed of the second type of material, wherein the first type of material is different in material type than the second type of material.

5. The compression packing seal of claim 4, wherein the first material when braided with the second material forms substantially half of the compression packing seal to form the dual sided compression packing seal.

6. The compression packing seal of claim 1, wherein the first material comprises carbon, polytetrafluoroethylene (PTFE), a para-aramid synthetic fiber, polybenzimidazole fiber (PBI), or 95%+ carbon.

7. The compression packing seal of claim 1, wherein the second material comprises acrylic, rayon, carbon, graphite, or fiberglass.

8. The compression packing seal of claim 1, wherein the first material and the second material have different properties.

9. The compression packing seal of claim 1, wherein the first material has a higher lubricity than the second material, a higher sealability than the second material, a higher extrusion resistance than the second material, or a higher thermal conductivity than the second material.

10. The compression packing seal of claim 1, wherein the second material has a lower cost than the first material, a higher malleability than the first material, or a higher modulus than the first material.

11. The compression packing seal of claim 1, further comprising one or more warps extending through the packing material in the longitudinal direction for reinforcing the compression packing seal, wherein the warps are formed from at least one of carbon, metal wire, para-aramid synthetic fiber, polybenzimidazole fiber (PBI), acrylic, rayon, graphite, or fiberglass.

12. The compression packing seal of claim 1, further comprising a third material different than the first material and the second material.

13. The compression packing seal of claim 1, further comprising a fourth material different than the first material, the second material, and the third material.

14. The compression packing seal of claim 1, wherein:
one or more of the first and second materials, when viewed in cross-section, are formed within the compression packing seal in a substantially triangular shape; and
one or more of the first and second materials, when viewed in cross-section, are formed within the compression packing seal in a substantially square shape.

15. The compression packing seal of claim 1, wherein the compression packing seal, when viewed in cross section, is substantially rectangular with a ratio of a side of the compression packing seal to another side of the compression packing seal being substantially 4:3.

16. A method of packing a stuffing box substantially surrounding a shaft to form a sealing system, the method comprising:
providing a compression packing seal according to claim 1; and
placing the compression packing seal in the stuffing box.

17. The method of claim 16, wherein the compression packing seal is placed in the stuffing box so that the first material faces the shaft and the second material faces outwards against a radially interior wall of a the stuffing box.

18. The method of claim 17, wherein the first material is selected based on one of the following properties of the sealing system: a type of fluid being sealed against, a projected speed of the shaft while in use, a type of abrasive being sealed against in conjunction with the shaft or stuffing box, or a projected pressure on the packing material while in use.

19. The method of claim 17, wherein the first material exhibits at least one of the following properties: a higher lubricity than the second material, a higher sealability than the second material, a higher extrusion resistance than the second material, or a higher thermal conductivity than the second material.

20. The method of claim 17, wherein the second material exhibits at least one of the following properties: a lower cost than the first material, a higher malleability than the first material, a higher modulus than the first material, or less polytetrafluoroethylene (PTFE) content than the first material.

21. The method of claim 16, wherein the stuffing box further comprises a lantern ring and the compression packing seal is a first compression packing seal provided between the lantern ring and a fluid to be sealed, and further comprising:
providing a second compression packing seal according to claim 1 on the opposite side of the lantern ring from the first compression packing seal,
wherein the first compression packing seal exhibits at least one of the following properties: higher lubricity than the second compression packing seal, higher thermal conductivity than the second compression packing seal, or higher sealability than the second compression packing seal; or
the second compression packing seal exhibits at least one of the following properties: higher strength than the first compression packing seal, or greater abrasion resistance than the first compression packing seal.

22. The method of claim 16, wherein the stuffing box further comprises a lantern ring and the compression packing seal is a first compression packing seal provided between the lantern ring and a fluid to be sealed, and further comprising:
providing a second compression packing seal according to claim 1 on the opposite side of the lantern ring from the first compression packing seal,
wherein the first compression packing seal has substantially the same construction as the second compression packing seal and is provided in the stuffing box in a different configuration than the second compression packing seal.

23. The method of claim 16, wherein the compression packing seal is a first compression packing seal, further comprising:
providing a second compression packing seal according to claim 1, wherein:
the first compression packing seal is provided on at least one longitudinal end of the stuffing box, and the first compression packing seal exhibits at least one of the following properties: higher strength than the second compression packing seal, a greater sealing surface speed capability than the second compression packing seal, or greater sealability than the second compression packing seal.

24. The method of claim 16, wherein the compression packing seal is provided in multiple layers around the shaft, and a layer closest to a longitudinally exterior position in the stuffing box is provided in a different configuration than a layer in a longitudinally interior position in the stuffing box.

25. A method of producing a braided dual-sided compression packing seal, wherein a longitudinal axis extends through the center of the packing material along a length of the compression packing seal, the method comprising:
providing a first material of a first material type and a second material of a second material type different than the first material type,
braiding the first material with the second material to form the compression packing seal in such a manner that the first material and the second material are disposed relative to each other such that, in cross-section, the compression packing seal has an asymmetrical configuration relative to a first axis that is substantially perpendicular to the longitudinal axis and is substantially perpendicular to a side of the compression packing seal, and wherein, as a result of the braiding, the first material is disposed substantially completely along one side of the compression packing seal and the second material is disposed substantially completely along the other side of the compression packing seal, wherein the first material is braided with the second material using an interbraid pattern.

26. The method of claim 25, wherein the first material and the second material are further braided with each other such that, in cross-section, the compression packing seal has a symmetrical configuration relative to a second axis perpendicular to the first axis.

27. The method of claim 25, wherein the compression packing seal comprises first and second exterior sides opposed to each other, and wherein the first material is braided to the second material such that the first exterior side is substantially composed of the first material and the second exterior side is substantially composed of the second material.

28. The method of claim 27, wherein the first material when braided with the second material forms substantially half of the compression packing seal.

29. A braided dual-sided compression packing seal, wherein a longitudinal axis extends through the center of the compression packing seal along a length of the compression packing seal, the compression packing seal comprising at least a first material made of carbon, polytetrafluoroethylene (PTFE), a para-aramid synthetic fiber, or polybenzimidazole fiber (PBI), and a second material made of acrylic, rayon, carbon, graphite, or fiberglass, wherein the first material is different in material type than the second material, and wherein the first material is braided with the second material to form the compression packing seal, wherein the first material and the second material are disposed relative to each other such that, in cross-section, the compression packing seal has an asymmetrical configuration relative to a first axis that is substantially perpendicular to the longitudinal axis and is substantially perpendicular to a side of the compression packing seal, wherein, as a result of the braiding, the first material is disposed substantially completely along one side of the compression packing seal and the second material is disposed substantially completely along the other side of the compression packing seal, and wherein the first material is braided with the second material using an interbraid pattern.

30. The compression packing seal of claim 29, wherein the first material has a higher lubricity than the second material, a higher sealability than the second material, a higher extrusion resistance than the second material, or a higher thermal conductivity than the second material.

31. The compression packing seal of claim 29, wherein the second material has a lower cost than the first material, a higher malleability than the first material, or a higher modulus than the first material.

* * * * *